(12) United States Patent
Lin et al.

(10) Patent No.: US 6,231,990 B1
(45) Date of Patent: May 15, 2001

(54) ADHESION PRIMER FOR USE WITH RTV SILICONES

(75) Inventors: Chiu-Sing Lin, Schenectady; Brian P. Bayly, Galway; Timothy J. Fahrenkopf, Rensselaer; Gary M. Lucas, Glenville, all of NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/337,444

(22) Filed: Jun. 21, 1999

(51) Int. Cl.$^7$ .................................................. B32B 27/30
(52) U.S. Cl. ..................... 428/447; 427/387; 428/451; 524/588; 525/100; 525/479; 156/329
(58) Field of Search ..................................... 525/100, 431, 525/479; 528/12, 18; 428/411.1, 447, 451; 427/387; 156/329

(56) References Cited

U.S. PATENT DOCUMENTS

| | | |
|---|---|---|
| 3,671,483 | 6/1972 | Young . |
| 4,147,685 | 4/1979 | Smith, Jr. . |
| 4,681,636 | 7/1987 | Saito et al. . |
| 4,749,741 | 6/1988 | Saito et al. . |
| 5,066,698 | * 11/1991 | Hazan et al. . |
| 5,458,980 | * 10/1995 | Larson . |
| 5,749,956 | * 5/1998 | Fisher et al. . |
| 5,912,086 | * 6/1999 | Ando et al. . |

FOREIGN PATENT DOCUMENTS

2991942  * 12/1994  (JP) .

* cited by examiner

*Primary Examiner*—Robert Dawson
*Assistant Examiner*—Marc S. Zimmer

(57) ABSTRACT

A low VOC primer composition suitable for use with room temperature vulcanizable silicones, comprising a polyorganosiloxane resin, an acrylic resin, an organotitanate, a silane or partial hydrolyzate thereof and an organic liquid in amount effective to dissolve the other components of the primer composition that provides improved adhesion to diverse substrates.

12 Claims, No Drawings

ADHESION PRIMER FOR USE WITH RTV SILICONES

CROSS-REFERENCE TO RELATED APPLICATIONS

Not applicable

FEDERALLY SPONSORED RESEARCH

Not applicable

FIELD OF THE INVENTION

The present invention relates to primer compositions, more specifically to primer compositions for bonding room temperature vulcanizable ("RTV") silicone elastomers to diverse substrates.

BRIEF DESCRIPTION OF THE RELATED ART

The use of primers for the purpose of improving the adhesion of RTV silicone elastomers are known, see for example, U.S. Pat. Nos. 4,681,636 and 4,749,741.

U.S. Pat. No. 4,147,685 discloses a primer composition that is a reaction product of methyl or butyl methacrylate and an acrylate functional silane in an organic solvent. The reaction product is made by heating the primer ingredients at a temperature of 50 to 80° C. in the presence of a peroxide catalyst. The compositions disclosed in the '685 patent exhibit improved adhesion to plastics, but have been found to be deficient when the solids content of the primer as unreacted acrylate functional silane monomer is less than 10%. Additionally, the compositions disclosed in the '685 patent exhibit high volatile organic compounds (VOCs).

What is needed in the art is a primer composition that provides improved adhesion to diverse substrates, particularly concrete and plastics, while exhibiting lower VOCs.

SUMMARY OF THE INVENTION

The present invention is directed to a low VOC primer composition suitable for use with room temperature vulcanizable silicone elastomers, comprising the product formed by combining:

(i) a polyorganosiloxane resin;

(ii) an acrylic resin;

(iii) an organotitanate;

(iv) a silane or partial hydrolyzate thereof; and (v) an organic liquid in amount effective to dissolve components (i), (ii), (iii) and (iv) of the primer composition.

The primer composition of the present invention provides improved adhesion to diverse substrates, particularly concrete.

DETAILED DESCRIPTION OF THE INVENTION

In a preferred embodiment, the primer composition of the present invention comprises, based on 100 parts by weight ("pbw") of the primer composition, from 1 pbw to 80 pbw, more preferably from 5 pbw to 50 pbw, still more preferably from 15 pbw to 25 pbw, of the polyorganosiloxane resin; from 0.1 pbw to 25 pbw, more preferably from 0.5 pbw to 15 pbw, still more preferably from 1 pbw to 10 pbw, of the acrylic resin; from 1 pbw to 25 pbw, more preferably from 5 pbw to 20 pbw, still more preferably from 8 pbw to 15 pbw, of the organotitanate; from 0.01 pbw to 20 pbw, more preferably from 0.1 pbw to 10 pbw, still more preferably from 0.2 pbw to 5 pbw, of the silane or partial hydrolyzate thereof; from 0.5 pbw to 95 pbw, more preferably from 25 pbw to 85 pbw, still more preferably from 50 pbw to 75 pbw, of the organic liquid.

Polyorganosiloxane Resin

Polyorganosiloxane resins that are suitable as the polysiloxane resin component of the composition of the present invention are those resins containing structural units according to the formula (I):

$$M_a D_b T_c \qquad (I)$$

wherein:

M is $R^1 R^2 R^3 SiO_{1/2}$;

D is $R^4 R^5 SiO_{2/2}$;

T is $R^6 SiO_{3/2}$;

$R^1$, $R^2$, $R^3$, $R^4$, $R^5$ and $R^6$ are each independently hydrogen or monovalent hydrocarbon radicals; and a, b and c are each integers, wherein $1 \leq a \leq 10{,}000$, $1 \leq b \leq 10{,}000$ and $1 \leq c \leq 10{,}000$.

Suitable monovalent hydrocarbon radicals include monovalent acyclic hydrocarbon radicals, monovalent alicyclic hydrocarbon radicals and monovalent aromatic hydrocarbon radicals.

As used herein, the terminology "acyclic hydrocarbon radical" means a straight chain or branched hydrocarbon radical, preferably containing from 2 to 24 carbon atoms per radical, which may be saturated or unsaturated. Suitable monovalent acyclic hydrocarbon radicals include, for example, methyl, sec-butyl, tert-butyl, octyl, decyl, dodecyl, cetyl, stearyl, propenyl, and butynyl.

As used herein, the terminology "alicyclic hydrocarbon radical" means a radical containing one or more saturated hydrocarbon rings, preferably containing from 4 to 10 carbon atoms per ring, per radical which may optionally be substituted on one or more of the rings with one or more alkyl or alkylene groups, each preferably containing from 2 to 6 carbon atoms per groups and which, in the case of two or more rings, may be fused rings. Suitable monovalent alicyclic hydrocarbon radicals include, for example, cyclohexyl, cyclooctyl.

As used herein, the term "aromatic hydrocarbon radical" means a hydrocarbon radical containing one or more aromatic rings per radical, which may optionally be substituted on the one or more aromatic rings with one or more alkyl or alkylene groups, each preferably containing from 2 to 6 carbon atoms per group, or other functional groups and which, in the case of two or more rings, may be fused rings. Suitable monovalent aromatic hydrocarbon radicals include, for example, aryl radicals such as, for example, phenyl, naphthyl and aralkyl, such as, for example, phenethyl.

In a preferred embodiment, $R^1$, $R^2$, $R^3$, $R^4$ and $R^5$ are each independently $(C_1-C_8)$alkyl, aryl or aralkyl.

In a more highly preferred embodiment, $R^1$, $R^2$, $R^3$, $R^4$ and $R^5$ are each independently methyl, propyl, octyl, phenyl or diphenyl.

Acrylic Resin

Acrylic resins that are suitable as the acrylic resin component of the composition of the present invention are homopolymers, comprising first repeating units derived from one monomer selected from (meth)acrylic ester monomers, (meth)acrylic acid monomers and (meth)acrylamide monomers and, optionally, second repeating units derived from one or more monoethylenically unsaturated monomers copolymerizable therewith. As used herein, the term "(meth)acrylic" refers collectively to acrylic and methacrylic, "(meth)acrylate" refers collectively to acrylates and methacrylates, and the term "(meth)acrylamide" refers collectively to acrylamides and methacrylamides.

Suitable (meth)acrylic ester monomers include, for example, alkyl (meth)acrylate monomers, preferably ($C_1$–$C_8$)alkyl (meth)acrylate monomers such as, for example, methyl methacrylate, butyl acrylate, ethylhexylmethacrylate; hydroxy($C_1$–$C_8$)alkyl (meth)acrylate monomers such as, for example, hydroxyethyl methacrylate; ($C_4$–$C_8$)cycloalkyl (meth)acrylate monomers such as, for example, cyclohexyl methacrylate. Suitable (meth)acrylic acid monomers include, for example, acrylic acid, methacrylic acid. Suitable (meth)acrylamide monomers include acrylamide and methacrylamide. Suitable copolymerizable monomers include, for example, monoethylenically unsaturated carboxylic acids such as, for example, itaconic acid; maleimide monomers such as, for example, N-alkyl maleimides, N-aryl maleimides, maleic anhydride, vinyl esters such as, for example, vinyl acetate, vinyl versatate and vinyl propionate.

In a preferred embodiment, the acrylic resin comprises an acrylic resin selected from poly(methyl methacrylate), poly(acrylonitrile), poly(acrylamide), poly(acrylic acid), and poly(methacrylic acid).

In a preferred embodiment, the acrylic resin has a weight average molecular weight of from 40,000 to 250,000 grams per mole ("g/mol"), more preferably from 75,000 to 200,000 g/mol, and still more preferably from 90,000 to 150,000 g/mol.

In a preferred embodiment, the acrylic resin comprises a resin selected from polymethylmethacrylate, polyacrylic acid, polyacrylamide, polymethacrylic acid or polyacrylonitrile. In a most preferred embodiment, the acrylic resin is Paraloid® B-72 acrylic resin (sold by Rohm and Haas Company).

Organotitanate

Organotitanates that are suitable as the organotitanate component of the composition of the present invention include, for example, organotitanate esters, titanium complexes, titanium chelate compounds, partially alkoxylated partial chelates of titanium, as well as partial hydrolysis-condensation products of any of these compounds.

In a preferred embodiment, the organotitanate component is an organotitanate ester according to the structural formula:

$$Ti(OR^7)_4$$

wherein each $R^7$ is independently ($C_1$–$C_8$)alkyl.

Preferably the organotitanate component comprises an organotitanate ester selected from the group consisting of tetrabutyl titanate, tetramethyl titanate, tetraisopropyl titanate, ethylmethyldibutyl titanate, tetraoctyl titanate, and tetraethylhexyl titanate. More preferably the organotitanate comprises tetrabutyl titanate.

Silane

Silanes are well known in the art. Silanes that are suitable as the silane component of the composition of the present invention are those that liberate alcohol upon hydrolysis. Examples of suitable silanes include tetraalkoxysilanes, organotrialkoxysilanes and diorganodialkoxysilanes, as well as partial hydrolyzates of any of these compounds.

In a preferred embodiment, the silane component of the primer composition of the present invention comprises a tetraalkoxysilane or a partial hydrolyzate thereof. More preferably, the silane component comprises a tetraalkoxysilane selected from the group consisting of tetraethoxy silane, tetrapropoxy silane, polyethyl silicate and polypropyl silicate. Even more preferably, the silane component comprises polyethyl silicate, a partial hydrolyzate of a silane.

Organic Liquid

Organic liquids that are suitable as the organic liquid component of the composition of the present invention are those organic liquids in which the polyorganosiloxane resin, the acrylic resin, the organotitanate and the silane components of the composition are each soluble.

In a preferred embodiment, the organic liquid is a low VOC organic liquid or a blend of two or more low VOC organic liquids selected from lower acyclic and salicyclic hydrocarbons, such as, for example, hexane, isododecane and cyclohexane; aromatic hydrocarbons such as for example, benzene, toluene and xylene; ketones, such as, for example, acetone, methyl ethyl ketone, and methyl isobutyl ketone; halogenated hydrocarbon solvents, such as, for example, trichloroethylene and parachlorobenzotrifluoride. As used herein, "low VOC" means that the volatile organic compound level is less than 350 g/l.

In a highly preferred embodiment, the organic solvent component comprises parachlorobenzotrifluoride.

Performance properties of the primer of the present invention compare favorably to those properties of primers with high VOC levels.

Other Components

The primer composition of the present invention, may, optionally, further include other components, such as, for example, stabilizers, colorant and any other components known in the art.

In a highly preferred embodiment, the primer composition of the present invention comprises, based on 100 pbw of the primer composition:

(i) from 15 pbw to 25 pbw of an polyorganosiloxane resin;

(ii) from 1 pbw to 10 pbw of an acrylic resin selected from polymethylmethacrylate, polyacrylic acid, polyacrylamide, polymethacrylic acid and polyacrylonitrile;

(iii) from 8 pbw to 15 pbw of an organotitanate resin selected from tetrabutyl titanate, tetramethyl titanate, tetraisopropyl titanate, ethylmethyldibutyl titanate, tetraoctyl titanate, and tetraethylhexyl titanate;

(iv) from 0.2 pbw to 5 pbw of a silane or partial hydrolyzate thereof resin selected from tetraethoxy silane, tetrapropoxy silane, polyethyl silicate and polypropyl silicate; and (v) from 50 pbw to 75 pbw of an organic liquid resin selected from trichloroethylene and parachlorobenzotrifluoride.

Processing and Use

The primer composition of the present invention is made by mixing and heating the components to provide a homogeneous solution. In a preferred embodiment, the components are mixed together in a particular order, with the polyorganosiloxane added to the solution at a slow rate.

The primer composition of the present invention is used by applying the primer to a substrate, by for example, brushing or coating the primer onto the substrate, allowing the primer to dry and then applying the RTV silicone elastomer composition, and curing the silicone elastomer. In a preferred embodiment, the primer is brushed onto the substrate.

The substrates to which the primer composition of the present invention provides improved adhesion to any difficult substrates, including metals, such as, for example, aluminum and stainless steel, synthetic resins, such as for example, polyvinyl chloride, polyacrylate and acrylic resins, as well as inorganic materials, such as, for example, glasses, concrete and ceramics. In a preferred embodiment, the primer composition will provide improved adhesion to wet pre-cast masonry concrete.

The primer composition of the present invention may be used for bonding a curable silicone elastomer composition to a substrate by: a) applying a primer composition to at least a portion of the surface of a substrate, the primer composition comprising: (i) a polyorganosiloxane resin; (ii) an acrylic resin; (iii) an organotitanate; and (iv) a silane or partial hydrolyzate thereof to form a primer layer on the substrate; b) applying a silicone elastomer to a substrate in contact with at least a portion of the primer layer; and c) curing the silicone elastomer.

The primer composition of the present invention may be used in an article comprising: a) a substrate; b) a layer of silicone elastomer on at least a portion of the surface of the substrate; c) a layer of a primer composition between at least a portion of the substrate and at least a portion of the silicone elastomer layer, the primer composition comprising: (i) a polyorganosiloxane resin; (ii) an acrylic resin; (iii) an organotitanate; and (iv) a silane or partial hydrolyzate thereof.

The primer composition of the present invention may be used with almost any RTV silicone elastomer compositions that can be used for the desired application.

EXAMPLE 1

In a suitable reaction vessel equipped with an agitator, heater, nitrogen purge and vacuum source, was charged an organic liquid (67 pbw parachlorobenzotrifluoride), and an organotitanate (9.7 pbw of tetrabutyl titanate). The contents of the reaction vessel were then gradually heated to 70° C. and mixed for ten minutes. A polyorganosiloxane resin (9 pbw polydimethylsiloxane) was then added to the reaction vessel at a rate of 7 pbw per minute). An acrylic resin (13 pbw Paraloid® B-72 acrylic resin) was added and the mixture was agitated for 60 minutes at 70° C. The solution was cooled for twenty to thirty minutes, until the solution temperature reached about 30° C. When the solution reached about 30° C., a silane (1.3 pbw ethyl silicate) was added. The solution was agitated for an additional thirty minutes. The solution was then filtered into a clean container, using caution not to expose the mixture to atmospheric moisture.

EXAMPLE 2

Peel adhesion was tested as follows. A thin film of the candidate primer was applied to the surface of the substrate panel with a paint brush. All substrates, except concrete, are cleaned with soap and water and allowed to dry for 25 to 30 minutes prior to use. Approximately 10 to 15 minutes following application of the primer, peel adhesion specimens were prepared using a silicone room temperature vulcanizable composition. A layer of sealant composition was applied to a 1 inch×8 inch substrate, and about 5 inches of a 1 inch×12 inch 20 mesh stainless steel screen (that has been primed with a primer and allowed to dry for 30 minutes) was applied over the layer of sealant composition. Another layer of sealant composition was applied over the top of the screen and excess composition was then scraped off, and the samples allowed to cure for 7 days. Additional, identical samples were prepared and cured for 7 days, followed by a 7 day exposure to water at 25° C.

The screen was folded back over itself and the distal end of the substrate and the distal end of the screen were each clamped in a tensile tester. A razor blade was used to make a cut through the edge of the sealant layer exposed between the substrate and the screen, at an angle of about 45° to the substrate surface, and the specimen was then subjected to tension at a crosshead speed of 2 inches per minute. Two more 45° cuts were made in the sealant, each spaced apart from the immediately preceding cut by about 1 inch. After 7 days of curing on the primed substrates, the specimens were tested for cohesive failure.

The median pull value of tension, in pounds per inch of sample width, required to cause failure was recorded. The relative amount of cohesive failure was determined by visual inspection of failure surfaces of the test samples, based on the relative amount of originally coated area to which sealant remains bonded.

Materials used

Primers: SS4044, SS4120, SS4179 are commercially available primers for use with RTV silicone compounds. The primers are available from General Electric Silicones.

RTV Silicone Sealants: The alkoxy RTV used in the example is a one-part silicone sealant, commercially available as Silpruf® Sealant from General Electric Silicones. The acetoxy RTV used in the example is a one-part silicone sealant commercially available as the Contractors SCS1000® Series from General Electric Silicones.

TABLE I

7 Day Peel Adhesion Test Results
ppi/% cohesive failure

| Silicone/ Substrate | Primer of Example 1 | No Primer | Primer SS4044 | Primer SS4120 | Primer SS4179 |
| --- | --- | --- | --- | --- | --- |
| Alkoxy RTV to Concrete | 66/100 | 54/100 | 41/100 | 54/100 | 54/100 |
| Acetoxy RTV to Polyacrylate | 15/70 | 0/0 | 6/5 | 0/0 | 24/100 |
| Alkoxy RTV to Mill Aluminum | 54/100 | 61/95 | 62/100 | 67/100 | 58/100 |
| Acetoxy RTV to Mill Aluminum | 19/100 | 24/40 | 30/100 | 26/100 | 23/100 |
| Alkoxy RTV to PVC | 58/100 | 51/95 | 37/50 | 60/100 | 54/100 |
| Acetoxy RTV to PVC | 20/95 | 0/0 | 8/5 | 26/100 | 24/100 |
| Alkoxy RTV to polycarbonate | 42/100 | 51/100 | 36/60 | 12/10 | 51/100 |
| Acetoxy RTV to polycarbonate | 22/95 | 0/0 | 0/0 | 3/5 | 26/100 |

The results in Table I show that both peel adhesion and the % cohesive failure generally are higher for samples using the low VOC primer of the invention than for existing primers. VOC level of the new primer of the invention is 337 g/l (below the EPA requirement of 350 g/l).

TABLE II

7 Day Water Immersion Test Results
ppi/% cohesive failure

| Silicone/ Substrate | Primer of Example 1 | No Primer | Primer SS4044 | Primer SS4120 | Primer SS4179 |
| --- | --- | --- | --- | --- | --- |
| Alkoxy RTV to Concrete | 19/30 | 11/0 | 23/0 | 18/5 | 19/5 |
| Alkoxy RTV to Mill Aluminum | 48/95 | 31/50 | 54/100 | 44/80 | 50/100 |

TABLE II-continued

| | 7 Day Water Immersion Test Results ppi/% cohesive failure | | | | |
|---|---|---|---|---|---|
| Silicone/ Substrate | Primer of Example 1 | No Primer | Primer SS4044 | Primer SS4120 | Primer SS4179 |
| Acetoxy RTV to Mill Aluminum | 2/5 | 13/40 | 7/0 | 10/10 | 15/20 |
| Alkoxy RTV to PVC | 54/95 | 14/0 | 39/85 | 32/80 | 61/100 |
| Acetoxy RTV to PVC | 19/80 | 0/0 | 3/<5 | 0/0 | 13/100 |
| Alkoxy RTV to polycarbonate | 48/100 | 52/100 | 44/90 | 36/80 | 62/100 |
| Acetoxy RTV to polycarbonate | 19/95 | 0/0 | 0/0 | 2/0 | 13/100 |

The results in Table II show that both peel adhesion and the % cohesive failure after 7 day water immersion are also generally are higher for samples using the low VOC primer of the invention than for existing primers.

What is claimed is:

1. A primer composition suitable for use with room temperature vulcanizable silicone elastomers, comprising the product formed by combining:
   (i) a polyorganosiloxane resin;
   (ii) an acrylic homopolymer resin;
   (iii) an organotitanate;
   (iv) a silane or partial hydrolyzate thereof; and
   (v) an organic liquid in amount effective to dissolve components (i), (ii), (iii) and (iv) of the primer composition.

2. The primer composition of claim 1, comprising the product formed by combining:
   (i) from about 15 to 25 parts by weight of the total composition of a polyorganosiloxane resin;
   (ii) from about 1 to 10 parts by weight of the total composition of an acrylic resin;
   (iii) from about 8 to 15 parts by weight of the total composition of an organotitanate;
   (iv) from about 0.2 to 5 parts by weight of the total composition of a silane or partial hydrolyzate thereof; and
   (v) from about 50 to 75 parts by weight of the total composition of an organic liquid to dissolve components (i), (ii), (iii) and (iv) of the primer composition.

3. The primer composition of claim 2, wherein the organotitanate is tetrabutyl titanate.

4. The primer composition of claim 2, wherein the silane is ethyl silicate.

5. The primer composition of claim 2, wherein the organic liquid is parachlorobenzotrifluoride.

6. A method for producing a primer composition suitable for use with room temperature vulcanizable silicone elastomers, comprising the steps of:
   a) mixing together the components of the primer composition comprising:
      (i) a polyorganosiloxane resin;
      (ii) an acrylic resin;
      (iii) an organotitanate;
      (iv) a silane or partial hydrolyzate thereof; and
      (v) an organic liquid in an amount effective to dissolve components (i), (ii), (iii) and (iv) of the primer composition; and
   b) heating and agitating the composition to form a homogeneous solution.

7. A method for bonding a curable silicone elastomer composition to a substrate comprising:
   a) applying a primer composition to at least a portion of the surface of a substrate, the primer composition comprising:
      (i) a polyorganosiloxane resin;
      (ii) an acrylic homopolymer resin;
      (iii) an organotitanate; and
      (iv) a silane or partial hydrolyzate thereof to form a primer layer on the substrate;
   b) applying a silicone elastomer to a substrate in contact with at least a portion of the primer layer; and
   c) curing the silicone elastomer.

8. An article made by the method of claim 7.

9. An article comprising:
   a) a substrate;
   b) a layer of silicone elastomer on at least a portion of the surface of the substrate;
   c) a layer of a primer composition between at least a portion of the substrate and at least a portion of the silicone elastomer layer, the primer composition comprising:
      (i) a polyorganosiloxane resin;
      (ii) an acrylic homopolymer resin;
      (iii) an organotitanate; and
      (iv) a silane or partial hydrolyzate thereof.

10. The primer composition of claim 1, wherein said organotitanate is at least about 1 part by weight of the total composition.

11. The method of claim 7, wherein the organotitanate is at least about 1 part by weight of the total primer composition.

12. The article of claim 9, wherein the the organotitanate is at least about 1 part by weight of the total primer composition.

* * * * *

UNITED STATES PATENT AND TRADEMARK OFFICE
CERTIFICATE OF CORRECTION

PATENT NO.    : 6,231,990 B1
DATED         : May 29, 2001
INVENTOR(S)   : Pascal Barbier et al.

It is certified that error appears in the above-identified patent and that said Letters Patent is hereby corrected as shown below:

<u>Title page,</u>
Item [73] Assignee: change "Lyons" to -- Lyon --.

<u>Column 12, claim 1,</u>
Line 63, change "arc" to -- are --.

Signed and Sealed this

Second Day of April, 2002

Attest:

JAMES E. ROGAN
Attesting Officer   Director of the United States Patent and Trademark Office

UNITED STATES PATENT AND TRADEMARK OFFICE
CERTIFICATE OF CORRECTION

PATENT NO.   : 6,231,990 B1
DATED        : May 15, 2001
INVENTOR(S)  : Chiu-Sing Lin et al.

It is certified that error appears in the above-identified patent and that said Letters Patent is hereby corrected as shown below:

This certificate supersedes certificate of correction issued April 2, 2002, the number was erroneously mentioned and should be vacated since no certificate of correction was granted.

Signed and Sealed this

Tenth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,231,990 B1
DATED : May 15, 2001
INVENTOR(S) : Chiu-Sing Lin et al.

It is certified that error appears in the above-identified patent and that said Letters Patent is hereby corrected as shown below:

This certificate supersedes Certificate of Correction issued April 2, 2002, the number was erroneously mentioned and should be vacated since no Certificate of Correction was granted.

Signed and Sealed this

Seventh Day of January, 2003

JAMES E. ROGAN
*Director of the United States Patent and Trademark Office*